United States Patent [19]

Hammond et al.

[11] Patent Number: 4,708,889

[45] Date of Patent: Nov. 24, 1987

[54] GLASS REPAIR OF HERMETIC PACKAGES

[75] Inventors: Ray L. Hammond, Scottsdale; Thomas B. Chatham, Mesa, both of Ariz.

[73] Assignee: Motorola, Inc., Schaumburg, Ill.

[21] Appl. No.: 877,647

[22] Filed: Jun. 23, 1986

[51] Int. Cl.⁴ ............... B05D 3/02; B29C 35/02; B32B 35/00; C03B 23/20

[52] U.S. Cl. ............... 427/140; 65/28; 156/94; 264/36; 264/102; 425/13; 427/397.7; 428/63

[58] Field of Search ............... 427/140, 294, 397.7; 264/36, 101, 102; 425/11, 13; 156/94, 325; 428/63, ; 65/28; 106/74

[56] References Cited

U.S. PATENT DOCUMENTS

| | | | |
|---|---|---|---|
| 2,063,667 | 12/1936 | Farkas et al. | 106/74 |
| 2,188,311 | 1/1940 | Reimers | 106/74 |
| 3,384,505 | 5/1968 | Palmer et al. | 427/294 |
| 3,493,405 | 2/1970 | Thomas | 106/53 |
| 3,532,575 | 10/1970 | Nagata et al. | 156/184 |
| 3,562,366 | 2/1971 | Sohy | 264/23 |
| 3,934,060 | 1/1976 | Burt et al. | 427/294 |
| 4,060,953 | 12/1977 | Milne | 427/294 |
| 4,086,309 | 4/1978 | Alberts | 264/36 |
| 4,165,397 | 8/1979 | Ogden et al. | 427/140 |
| 4,419,305 | 12/1983 | Matles | 264/36 |

*Primary Examiner*—Jan H. Silbaugh
*Assistant Examiner*—Karen D. Kutach
*Attorney, Agent, or Firm*—Maurice J. Jones, Jr.; Eugene A. Parsons

[57] ABSTRACT

A method for repairing fine leaks in the envelope of hermetically sealed packages is accomplished by using a liquid silicate and solvent mixture which is liquid well below the melting point of glass and which leaves a silicate patch after the solvent is removed.

3 Claims, No Drawings

GLASS REPAIR OF HERMETIC PACKAGES

BACKGROUND OF THE INVENTION

The present invention pertains to a method whereby fine leaks in the envelope of hermetically sealed packages can be repaired using a silicate and solvent mixture. Electrical components are hermetically sealed in packages to prevent damaging impurities, such as water vapor, from reaching them. A leak will give these damaging impurities access. A process called "docking" has been used to seal these leaks, but this process used a plastic resin as the sealing substance. This resin was found to be moisture permeable and to have a thermal coefficient of expansion that was different from that of the envelope of the package. Thus, the package was not satisfactorily sealed. Packages which leak must be discarded which, since most of the materials and labor have been invested by this time, is very expensive.

SUMMARY OF THE INVENTION

The principle object of the present invention is to provide a method for repairing fine leaks in the envelope of hermetically sealed packages containing electrical components so that damaging impurities cannot enter. this will substantially reduce the cost of these components.

In this invention a liquid, silicate and solvent mixture is forced into a leak and then baked to remove the solvent, leaving a glassy silicate patch. This is a true glass patch with a thermal coefficient of expansion closely matching that of the envelope. This glass patch also adheres well to both glass, Kovar and many other metals and materials used in the packages, such as ceramics.

DESCRIPTION OF THE PREFERRED EMBODIMENT

The present invention repairs fine leaks in hermetically sealed packages. These packages can be composed of glass and many other metals and materials, such as ceramics. In this specific example, the packages are composed of glass and Kovar. A percentage of "hermetic" packages are found to have unacceptable leakage during leak test. Repairing these packages, thus making them acceptable, greatly reduces the cost of these components. The repairs are accomplished by using a liquid silicate compound such as tetraethylorthosilicate (TEOS). The liquid, glass and solvent mixture is in liquid form at a temperature well below the melting point of glass, and is relatively easily inserted into a leak.

A specific example of inserting the liquid into a leak is placing the faulty package in a TEOS bath then applying a pressure to the surface of the bath such as 60 psi for four hours. It should be obvious to one skilled in the art that various pressures and times could be used. The higher the pressure used within limits dictated by package characteristics, the less time that is required. The TEOS is thereby forced into any cracks or pin holes. This method works on any leak, although major leaks tend to admit too much TEOS which will then pool inside the package. This pooling may damage some types of components.

Another specific example is using a vacuum bake method for filling the leak. In this example, a package is baked in a low pressure oven in order to reduce the pressure inside the package. The package is then removed from the oven and placed in a TEOS bath. The pressure inside the package will equalize with the outside atmosphere very slowly due to the small size of the leaks. This allows enough time to place the package, with low interior pressure, in a TEOS bath. Once the package is in the bath the TEOS is drawn into the leaks. This method can only be used when the crack extends completely into the package.

When the package is removed from the bath the undesired TEOS from the outer surface is removed. This is accomplished by a wash in a solvent such as ethynol or methynol. Then the solvent is baked out of the TEOS leaving a deposit of $SiO_2$ which forms a solid glass patch.

In these specific examples the packages were baked at a temperature of 75° C. for four hours. However, any temperature that allows the removal of the solvent without creating cracks in the patch can be used. The resulting patch is true glass which adheres well to the glass or Kovar of the package. The thermal coefficient of expansion for the patch is closely matched to both glass and Kovar. Thus, a patch that is virtually indistinguishable from the package is created easily and results in large savings. While we have shown and described specific embodiments of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

What is claimed is:

1. A method for repairing leaks in an envelope of a hermetically sealed package containing electrical components, which package is formed from materials selected from the group consisting of metal, glass and ceramic, said method comprising the steps of:
    providing a liquid, silicate and solvent mixture including tetraethylorthosilicate;
    creating a lower pressure inside the envelope to be repaired;
    applying the liquid, silicate and solvent mixture to the envelope to be repaired so the liquid silicate and solvent mixture is drawn into leaks in the envelope due to the lower pressure; and
    removing the solvent from the mixture in the leaks by baking the package, thereby leaving a solid silicate patch having a thermal coefficient of expansion closely matching that of the envelope.

2. The method of claim 1 wherein the step of creating a lower pressure includes baking the package to be repaired in a low pressure oven.

3. The method of claim 1 wherein the step of applying the liquid, silicate and solvent mixture includes submerging said package in a bath of said liquid, silicate and solvent mixture.

* * * * *